(12) United States Patent
Westlake

(10) Patent No.: US 8,914,175 B2
(45) Date of Patent: Dec. 16, 2014

(54) ELECTRIC MOTOR VEHICLE

(75) Inventor: Barry Westlake, Pymble (AU)

(73) Assignees: Barry Westlake (AU); John Hanson Boorne (AU)

(*) Notice: Subject to any disclaimer, the term of this patent is extended or adjusted under 35 U.S.C. 154(b) by 8 days.

(21) Appl. No.: 13/123,035

(22) PCT Filed: Oct. 16, 2009

(86) PCT No.: PCT/AU2009/001359
§ 371 (c)(1),
(2), (4) Date: Jul. 11, 2011

(87) PCT Pub. No.: WO2010/042989
PCT Pub. Date: Apr. 22, 2010

(65) Prior Publication Data
US 2011/0288707 A1   Nov. 24, 2011

(30) Foreign Application Priority Data

Oct. 16, 2008 (AU) .............................. 2008905352

(51) Int. Cl.
| | |
|---|---|
| *B60L 11/00* | (2006.01) |
| *B60K 7/00* | (2006.01) |
| *B60L 11/18* | (2006.01) |
| *B60K 1/04* | (2006.01) |

(52) U.S. Cl.
CPC ........... *B60K 7/0007* (2013.01); *B60L 2260/28* (2013.01); *Y02T 10/7258* (2013.01); *B60L 2001/0411* (2013.01); *B60L 2220/44* (2013.01); *B60K 2007/0038* (2013.01); *Y02T 10/7005* (2013.01); *Y02T 10/7011* (2013.01); *Y02T 10/7022* (2013.01); *B60L 11/1803* (2013.01); *B60K 2007/0092* (2013.01); *B60L 11/005* (2013.01); *B60L 2200/22* (2013.01)
USPC .......................................... 701/22; 180/65.31

(58) Field of Classification Search
USPC ............ 701/22, 69–72; 180/65.31, 65.6, 197, 180/214–221; 307/9.1
See application file for complete search history.

(56) References Cited

U.S. PATENT DOCUMENTS

| | | |
|---|---|---|
| 3,421,596 A | 1/1969 | Christensen |
| 3,792,742 A | 2/1974 | Mager |

(Continued)

FOREIGN PATENT DOCUMENTS

| | | |
|---|---|---|
| CN | 1765649 A | 5/2006 |
| CN | 101020409 A | 8/2007 |

(Continued)

OTHER PUBLICATIONS

"International Application No. PCT/AU2009/001359, Written Opinion mailed Jan. 27, 2010", 4pgs.

(Continued)

*Primary Examiner* — Yonel Beaulieu
(74) *Attorney, Agent, or Firm* — Schwegman Lundberg & Woessner, P.A.

(57) ABSTRACT

Various embodiments include an electric motor vehicle which does not have any active suspension components, gearbox, differential or other mechanical transmission components, in various embodiments including consists a chassis, at least one pair of integrated wheel and brushless DC electric motor assemblies mounted on the chassis with conventional suspension components including springs and dampers. In various embodiments, a battery pack on the chassis provides power to the integrated wheel and electric motor assemblies; and a control system operates each integrated wheel and motor assembly independently of each other integrated wheel and motor assembly. Various embodiments include the control system including a master controller connected to the battery pack, and, a separate slave controller connected to the battery pack and to each of the integrated wheel and motor assemblies as well as the master controller.

27 Claims, 10 Drawing Sheets

(56) References Cited

U.S. PATENT DOCUMENTS

| | | | |
|---|---|---|---|
| 4,021,690 | A | 5/1977 | Burton |
| 4,913,258 | A | 4/1990 | Sakurai et al. |
| 5,082,081 | A | 1/1992 | Tsuyama et al. |
| 5,289,093 | A | 2/1994 | Jobard |
| 5,343,128 | A | 8/1994 | Beltrame et al. |
| 5,418,437 | A | 5/1995 | Couture et al. |
| 5,438,228 | A | 8/1995 | Couture et al. |
| 5,508,924 | A | 4/1996 | Yamashita |
| 5,540,296 | A | 7/1996 | Strothmann |
| 5,973,463 | A | 10/1999 | Okuda et al. |
| 6,385,522 | B1 * | 5/2002 | Pugh ............... 701/70 |
| 6,732,827 | B2 | 5/2004 | San Miguel |
| 7,306,065 | B2 | 12/2007 | Nagaya |
| 2003/0000754 | A1 * | 1/2003 | Daudt ............... 180/220 |
| 2005/0045392 | A1 | 3/2005 | Maslov et al. |
| 2006/0196712 | A1 * | 9/2006 | Toyota et al. ............... 180/165 |
| 2007/0213912 | A1 | 9/2007 | Deur et al. |
| 2007/0278023 | A1 | 12/2007 | Masut et al. |
| 2009/0289512 | A1 * | 11/2009 | Prucher ............... 310/54 |

FOREIGN PATENT DOCUMENTS

| | | |
|---|---|---|
| CN | 101074037 A | 11/2007 |
| FR | 2592342 A1 | 7/1987 |
| WO | WO-93/05977 A1 | 4/1993 |
| WO | WO-98/19875 A1 | 5/1998 |
| WO | WO-2004/073155 A1 | 8/2004 |
| WO | WO-2008/007120 A2 | 1/2008 |
| WO | WO-2010/042989 A1 | 4/2010 |

OTHER PUBLICATIONS

"Motors Senza Spazzola Del Mozza Fabbricanti e Fornitori da Alibaba.com", [online]. [retrieved Dec. 17, 2009]. Retrieved from the Internet: <Url: http://italian.alibaba.com/product-cgs/brushless-hub-motor-239734895.html>, 4 pgs.

"International Application No. PCT/AU2009/001359, International Search Report mailed Jan. 27, 2010", 4 pgs.

"Chinese Application No. 200980141046.2, Office Action dated Jan. 28, 2013 [English translation attached]", 7 pgs.

Chinese Application No. 200980141046.2, Office Action dated Sep. 30, 2013, (w/ English Translation), 10 pgs.

Australian Application Serial No. 2008905352, Search Report mailed Jan. 2, 2009, 3 pgs.

"In Wheel Motor—After Gutenberg", [online]. [retrieved on Dec. 10, 2009]. Retrieved from the Internet: <URL: http://jcwinnie.biz/wordpress/?p-1010>, (2009), 4 pgs.

International Application Serial No. PCT/AU2009/001359, International Preliminary Report on Patentability mailed Apr. 28, 2011, 6 pgs.

Chinese Application Serial No. 200980141046.2, Office Action mailed Mar. 21, 2014, (w/ English Translation), 16 pgs.

Australian Application Serial No. 2009304587, Examination Report No. 1 dated Jun. 3, 2014, 3 pgs.

\* cited by examiner

MASTER - SLAVE CONTROLLER LOGIC

Block Diagram – Slave Controller

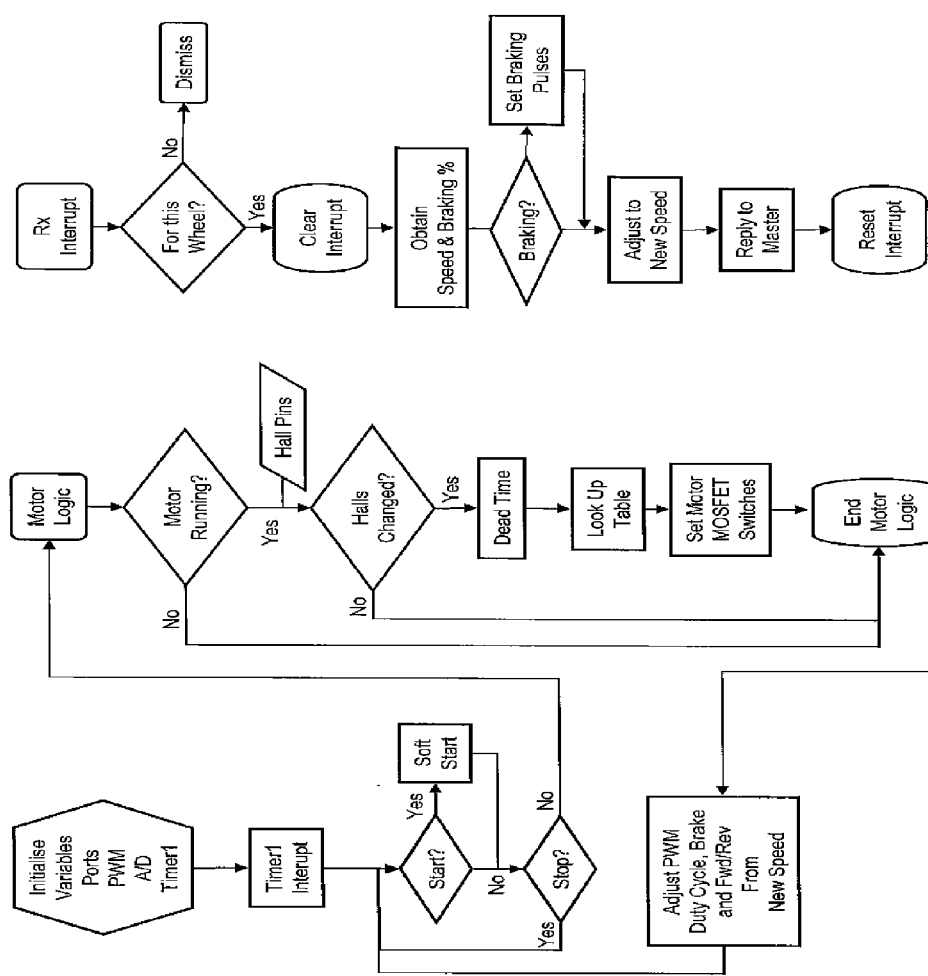
Fig. 9 SLAVE CONTROLLER

Master

Slave

Slave

ELECTRIC MOTOR VEHICLE

PRIORITY CLAIM TO RELATED APPLICATIONS

This application is a national stage application under 35 U.S.C. §371 of PCT/AU2009/001359, filed Oct. 16, 2009, and published as WO 2010/042989 A9 on Apr. 22, 2010, which claims priority to Australian Application No. 2008905352, filed Oct. 16, 2008, which applications and publication are incorporated herein by reference and made a part hereof in their entirety, and the benefit of priority of each of which is claimed herein.

TECHNICAL FIELD

This invention relates to electric motor vehicles and more particularly to low speed electric motor vehicles suitable for use as resort cars or golf cars.

BACKGROUND ART

Prior art electrical vehicles typically incorporate a brushed motor gearbox train and require a substantial bank of batteries in order to operate. The use of a gearbox train to transfer the power from the motor to the four wheels causes losses in efficiency. Sometimes as much as 50% of the power input to the electric motor is lost before being transferred to the wheels of the vehicle.

Electric vehicles incorporating In-wheel electric motor systems have been developed in the past that have sought to overcome the issue of loss of power and reduced efficiencies associated with conventional electric drive trains. Whilst these in-wheel electric motor vehicles have lower power losses and are more efficient, these vehicles have associated with them, the problem of poor road holding performance. The reason these vehicles perform badly on the road is a result of increases in their so-called "un-sprung mass".

The un-sprung mass of a ground vehicle with a suspension is the mass of the suspension, wheels or tracks (as applicable), and other components directly connected to them. The mass of the body and other components supported by the suspension is the sprung mass. Un-sprung mass includes the mass of components such as the wheel axles, wheel bearings, tyres, springs, shock absorbers, and suspension links.

As the un-sprung mass of a vehicle increases, the contact force of a tyre fluctuates when the vehicle runs over an uneven road, resulting in deteriorated road holding properties.

When in-wheel motors are utilised instead of a central electric motor the effect on the un-sprung and sprung masses are twofold. Firstly the sprung mass of the vehicle decreases as the motor and transmission which originally sat on a suspended chassis is taken off the chassis. Secondly, since the motor stator of the in-wheel motor is rotatably fixed to a spindle shaft connected to a part called an "upright" or "knuckle" which is one of the parts around the wheels of the vehicle, the un-sprung mass of the vehicle increases when an in-wheel motor is mounted, thereby deteriorating the road holding properties of the vehicle.

As a result of the large un-sprung masses associated with in-wheel electric motors, the road holding performance, and consequently safety, of these vehicles is seriously compromised.

Even when the mass of the body of a vehicle, so-called "sprung mass" is small, the road holding properties of such vehicles deteriorates when in-wheel electric motors are used. As a result, the in-wheel motor vehicle is rarely used although it is a very attractive electric car having excellent space efficiency and transmission efficiency of driving force.

One attempt at overcoming the problem of increased sprung mass when in-wheel electric motors are introduced into a vehicle to replace a centrally mounted electric motor is to be found in U.S. Pat. No. 7,306,065 which discloses a method of mounting an in-wheel motor and an in-wheel motor system both of which are capable of reducing the tyre contact force fluctuation of a vehicle to improve the road holding properties of the vehicle so as to overcome the above-mentioned problems of the earlier prior art. However, the way in which the inventor has done this is to introduce very complicated and sophisticated active suspension components that constantly monitor pressures exerted on the wheels by the terrain and by the suspended chassis to compensate for the differences in pressures through the use of active suspension components. Such an approach adds complexity and raises the cost to manufacture in-wheel electric vehicles.

The problems caused by un-sprung mass result in the introduction of variable force between the wheel and the ground. This can result in wheels locking under braking or spinning even under minimal acceleration and especially under strong acceleration. This locking and spinning contributes further to the poor road-holding experienced in the general motor vehicle industry.

It has been determined by the present inventor that by reducing the mass of in-wheel electric motors and by reducing the un-sprung mass of the vehicle generally it is possible to design a vehicle that uses in-wheel electric motors without active suspension and which has acceptable road holding performance. In particular, it has been discovered that a golf course or resort vehicle with in-wheel electric motors mounted on traditional suspension components, can adequately maintain grip on the road and provide acceptable road holding performance. As will be described below, if in-wheel electric motors weighing up to 7 kg (which provide up to 1 KW in power output) are utilised in a golf course or resort vehicle of approximately 450 kg, performance will be adequate for most road conditions encountered. If however, the road and or other surface conditions are going to challenge the vehicle, for instance, unsealed road surfaces, or hilly terrain, active control systems are provided by the present invention which result in good road holding performance without the need to provide active suspension.

The inventor has found that anti-lock braking, active traction control and providing electronic differential speed controls, when provided in an electric vehicle fitted with in-wheel electric motors, overcome the previously documented problems associated with un-sprung mass without the need to provide active suspension components.

Golf course or resort vehicles are fairly small in dimension, and often lack components such as a roof, windows and doors. Typically these vehicles are generally around 4 feet (1.2 m) wide×8 feet (2.4 m) long×6 feet (1.8 m) high and weigh 900 pounds (410 kg) to 1,000 pounds (450 kg) (which is more than half the weight of highway vehicles). Such a vehicle equipped with in-wheel electric motors will end up having a maximum speed of 30 kph which is more than enough for use as a:

(a) golf course car;
    (b) resort car;
    (c) CBD/metro car;
    (d) utility vehicle for carrying a payload such as landscaping material;
    (e) factory or studio vehicle;
    (f) airside airport vehicle.

Thus although the present invention will be described by reference to a "golf course and resort vehicle" the person skilled in the art will appreciate that the term applies to any vehicle of relatively small dimensions and weight and which is principally concerned with transporting people, or other payload, short distances at low speed.

DISCLOSURE OF INVENTION

According to a first aspect of the invention there is provided an electric motor vehicle without any active suspension components, gearbox, differential or other mechanical transmission components the golf course or resort vehicle comprising:
  (i) a chassis,
  (ii) at least one pair of integrated wheel and brushless DC electric motor assemblies attached to the chassis with conventional suspension components including springs and dampers,
  (iii) a battery pack carried by the chassis and providing power to the integrated wheel and electric motor assemblies; and
  (iv) a control system for operating each integrated wheel and motor assembly independently of each other integrated wheel and motor assembly, the control system comprising a master controller connected to the battery pack, and, a separate slave controller connected to the battery pack and to each of the integrated wheel and motor assemblies and to the master controller.

Preferably each integrated wheel and brushless DC motor assembly provides up to 1 KW of power and weighs between 5 and 7 kg.

In a further preferred form of the invention the vehicle's control system provides for at least one the following functions:
  (a) anti-lock braking whereby a wheel does not lock up when braking,
  (b) active traction control such that a wheel does not spin under acceleration or normal operation,
  (c) an electronic differential such that in a corner, the inside wheels are allowed to slow down while the outside wheels speed up.

In a further preferred form the invention the master controller and the slave controllers combine in operation together to provide all of the following functions:
  (a) anti-lock braking whereby a wheel does not lock up when braking,
  (b) active traction control such that a wheel does not spin under acceleration or normal operation, and
  (c) an electronic differential such that in a corner, the inside wheels are allowed to sow down while the outside wheels speed up.

According to a second aspect of the invention there is provided an electric motor vehicle without any active suspension components, gearbox, differential or other mechanical transmission components comprising:
  (i) a chassis,
  (ii) at least one pair of integrated wheel and brushless DC electric motor assemblies mounted on the chassis with conventional suspension components including springs and dampers,
  (iii) a battery pack carried by the chassis and providing power to the integrated wheel and electric motor assemblies
  (iv) a control system for operating each integrated wheel and motor assembly independently of each other integrated wheel and motor assembly, the control system comprising a master controller connected to the battery pack, and, a separate slave controller connected to the battery pack and to each of the integrated wheel and motor assemblies and to the master controller, the master controller and the slave controllers combining together to provide one or more of the following functions:
  (a) anti-lock braking whereby a wheel does not lock up when braking,
  (b) active traction control such that a wheel does not spin under acceleration or normal operation,
  (c) an electronic differential such that in a corner, the inside wheels are allowed to slow down while the outside wheels speed up.

In a preferred form of this aspect of the invention, the master controller and the slave controllers combine in operation together to provide all of the following functions:
  (a) anti-lock braking whereby a wheel does not lock up when braking,
  (b) active traction control such that a wheel does not spin under acceleration or normal operation, and
  (c) an electronic differential such that in a corner, the inside wheels are allowed to sow down while the outside wheels speed up.

BRIEF DESCRIPTION OF THE DRAWINGS

FIG. 9 is the logic diagram for the slave controller of the control system.

BEST MODE FOR CARRYING OUT THE INVENTION

Figure 1:
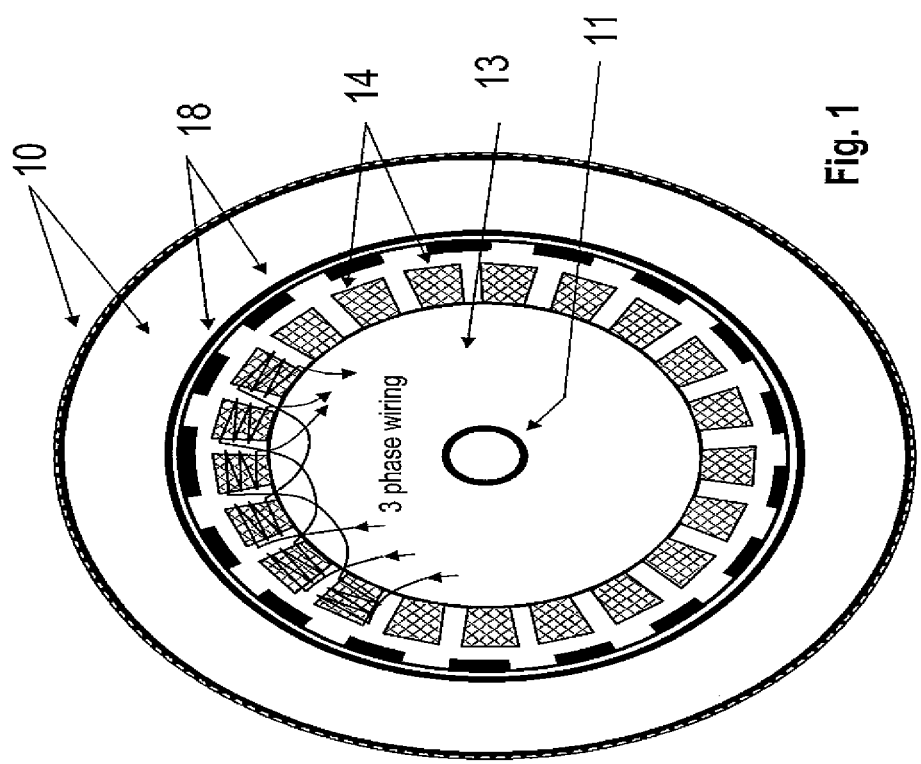
FIG. 1 is a side view of an integrated wheel and brushless DC electric motor assembly for use with the low speed vehicle of the invention.
Figure 2:
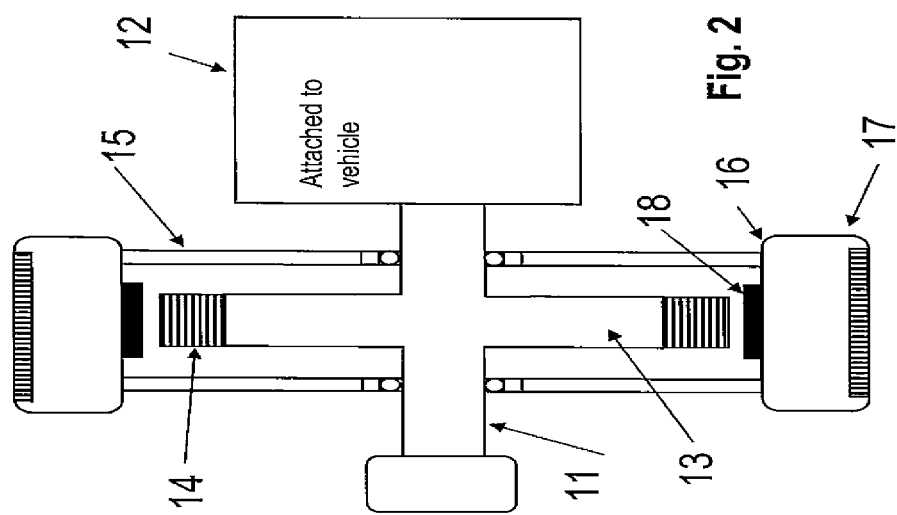
FIG. 2 is a plan view of the wheel and motor assembly shown in FIG. 1.
Figure 3:
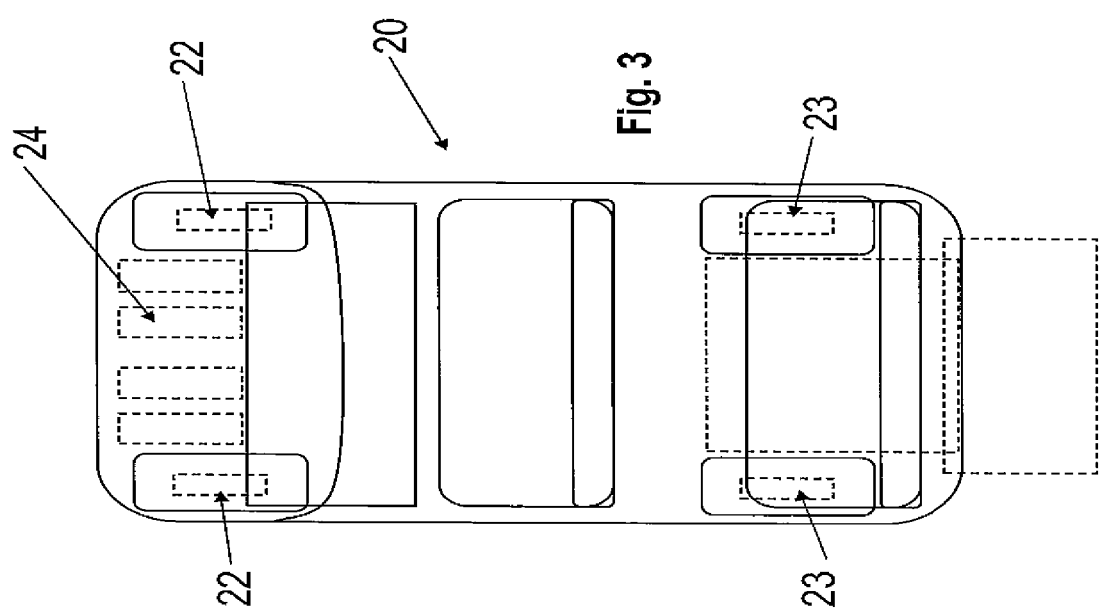
FIG. 3 is a plan view of an electric vehicle incorporating a front pair of integrated wheel and motor assemblies and a rear pair of integrated wheel and motor assemblies.
Figure 4:
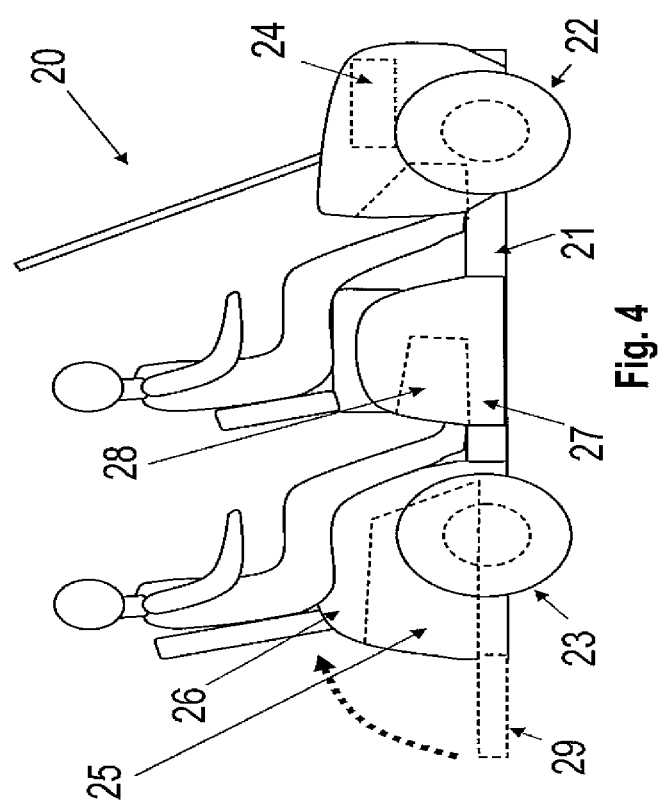
FIG. 4 is a side view of the vehicle shown in FIG. 3.

The integrated wheel and brushless direct current electric motor assembly 10 shown in FIG. 1 has an axle 11 adapted to be attached to the vehicle shown in FIGS. 3 and 4 by a conventional passive suspension consisting of springs and dampers (often called shock absorbers) 12 shown in FIG. 2. Non-rotatably mounted on the axle 11 is a stator 13 which has a plurality of field coils 14 connected as three phase windings adapted to generate a rotating magnetic field. A hub 15 is rotatably mounted on the axle 11 and has an outer rim 16. A tyre 17 is mounted on the outer circumference of the rim 16 and a plurality of rotating permanent magnets 18 are mounted on the inner circumference of the rim in register with the field coils 14 of the stator so as to be rotatably driven thereby.

The low speed electric vehicle 20 shown in FIGS. 3 and 4 has a chassis 21 on which is mounted a front pair of integrated wheel and electric motor assemblies 22 and a rear pair of integrated wheel and electric motor assemblies 23. A battery pack 24 is mounted at the front of the vehicle 20. However, the battery pack 24 may be located elsewhere on the vehicle 20. At the rear of the vehicle 20 there is a flexible luggage space 25 which is beneath the rear seat 26. The luggage space 25 is optionally extended by the tray 29 which may be moved by folding or sliding. The front seat 27 has a recess 28 for the feet of the rear passengers. In this instance, the vehicle weighs approximately 450 kg.

Figure 5:
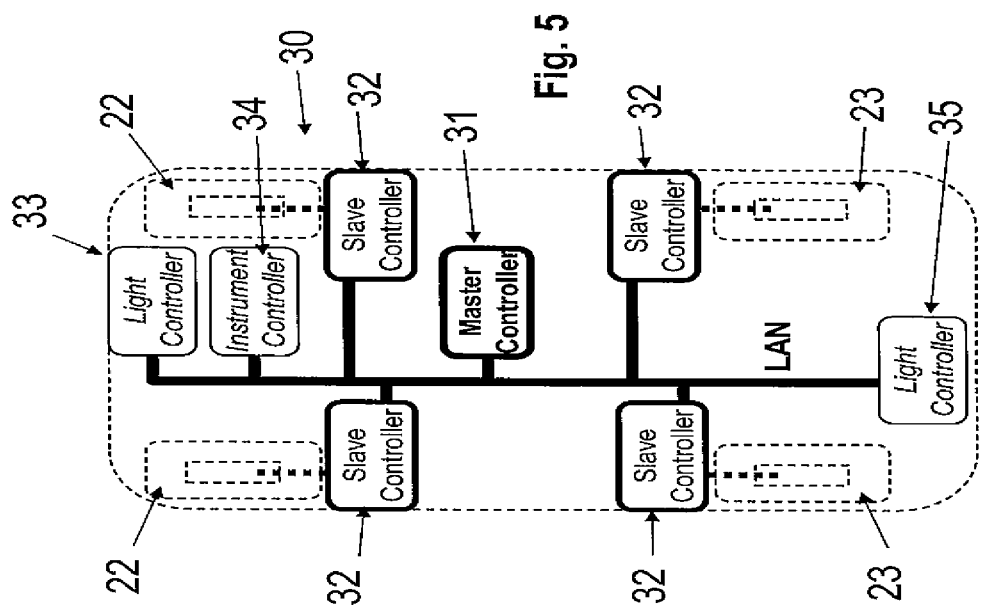
FIG. 5 is a schematic diagram of the control system incorporated in the vehicle shown in FIGS. 3 and 4.

The control system 30 shown in FIG. 5 includes a master controller 31 and slave controllers 32 connected to each of the integrated wheel and electric motor assemblies 22 and 23. The control system also includes a front light controller 33, an instrument controller 34 and a rear light controller 35.

Figure 6:
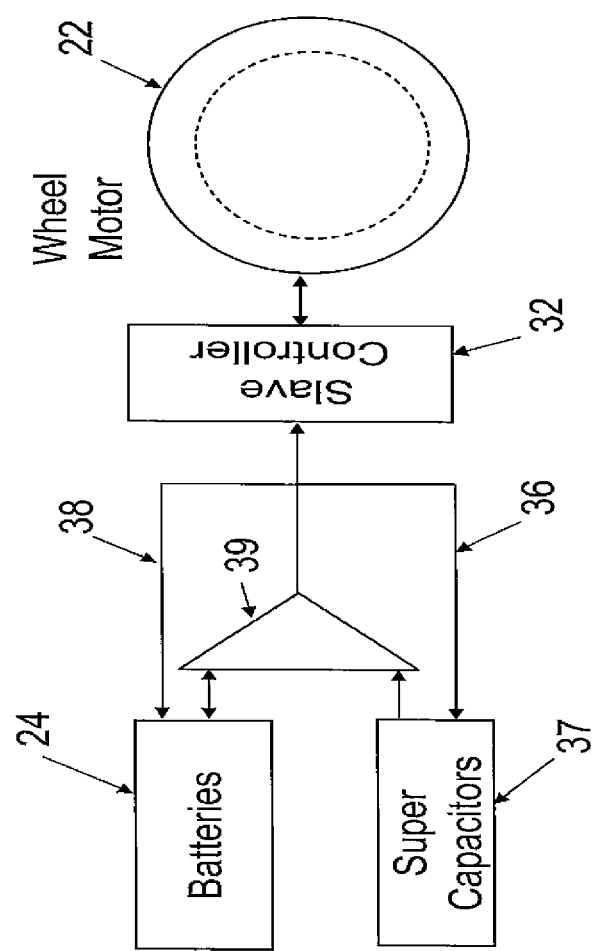
FIG. 6 is a schematic diagram of the battery pack, supercapacitors and control system.

As shown in FIG. 6, the battery pack 24 is connected to a controller 25 which in turn provides power to the integrated wheel and motor 22 and 23 through slave controller 32. Upon braking of the wheel motor 22 and 23, current returns through line 38 to the batteries 24 and, in this instance, through line 36 to the super capacitors 27 which can also provide power to the battery and/or the integrated wheel and motor assembly 22 and 23 through the controller 39.

Figure 7:
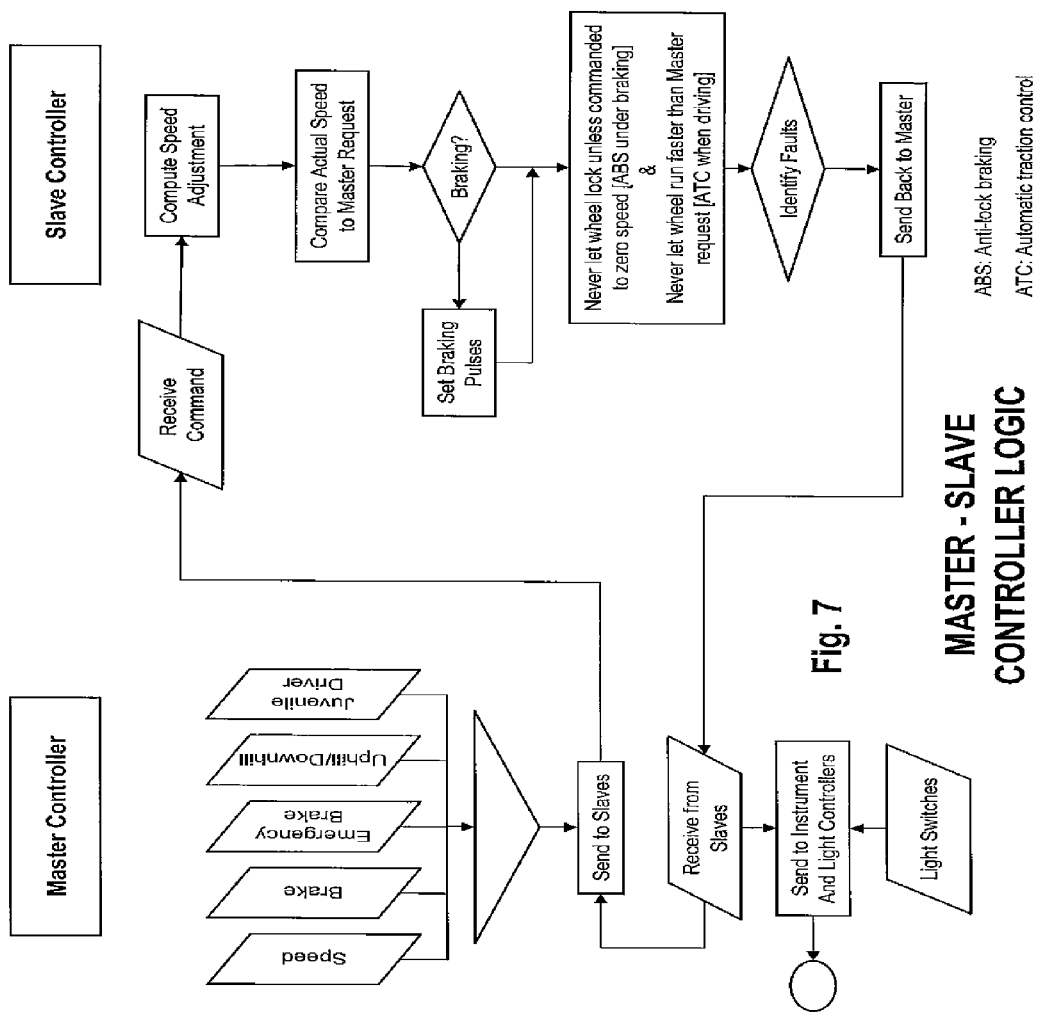
FIG. 7 is a logic diagram for the master and slave controllers.

FIG. 7 is a logic diagram for the master and slave controllers. For the master controller, there are a number of simultaneous inputs that must be managed in real-time. These inputs are received and processed by the controller and instructions are sent to each slave controller across a communications line. The slave controller attempts to perform these requests and feeds back information to the master controller regarding various statistics collected for each wheel. This information is further received and processed by the master controller and may result in new instructions being sent to each slave controller.

Figure 8:
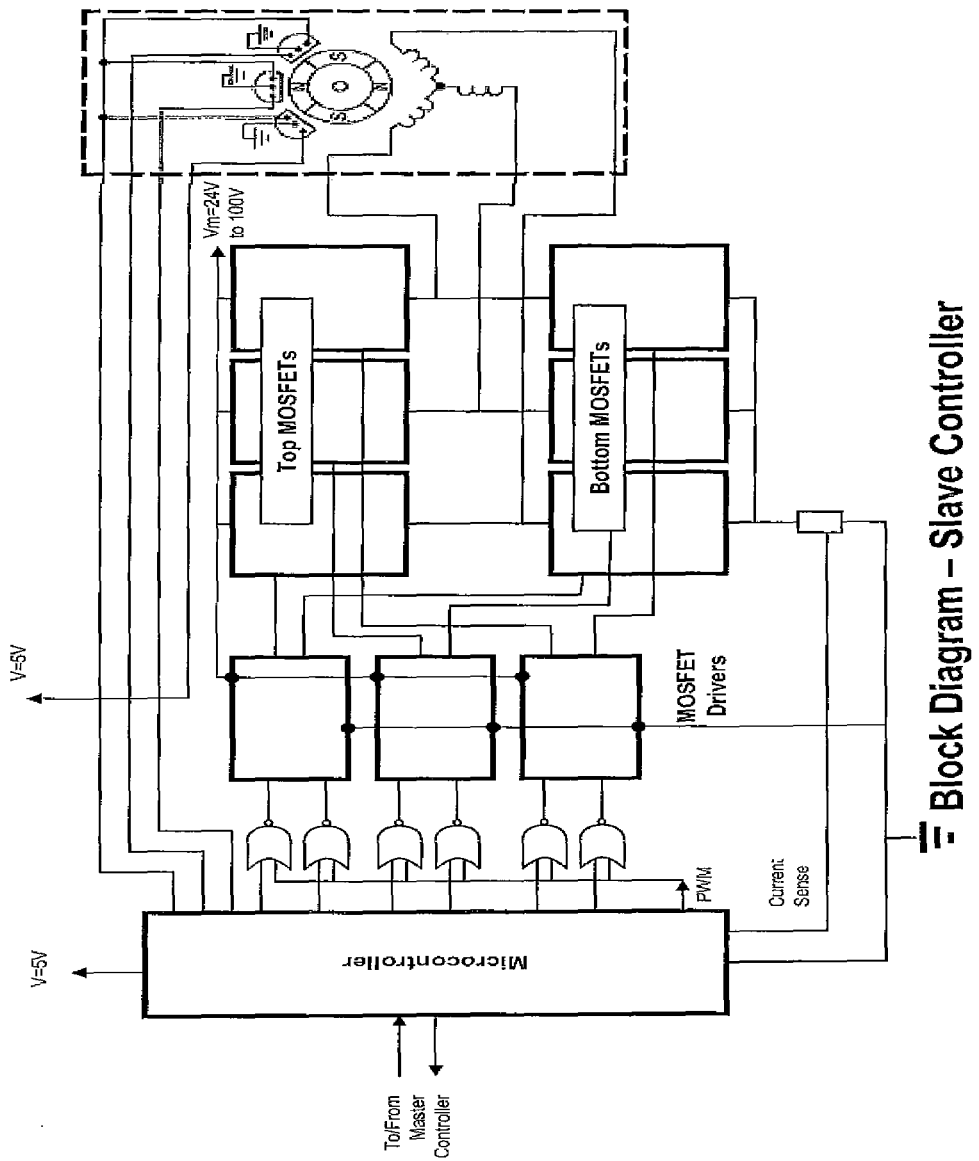
FIG. 8 is a self-explanatory block diagram for the slave controller of the control system.

FIG. 8 is a block diagram for the slave controller of the control system. The slave controller uses an intelligent microcontroller, which contains a central processing unit, volatile and non-volatile memory and a number of subsystems for handling all of the input and output functions. The current devices use a Microchip PIC16F883 28-pin microcontroller sourced from USA. The outputs from the microcontroller are passed to power transistor controllers which in turn control the rapid switching of the power transistors. The power transistors are switched on and off within micro-seconds and permit currents in excess of 40 Amps to be turned on and off without the generation of significant amounts of heat. The six power transistors are connected directly to the 3-phase brushless DC motor and perform functions equivalent to the brushes and commutator of a brushed DC motor. The efficiency of this type of electronic control significantly improves operating efficiency compared with the mechanical mechanism in a brushed DC motor. The power transistors currently deployed are Metal Oxide Semiconductor Field Effect Transistors (MOSFET) which are common in control systems throughout the motor vehicle industry. The whole process is controlled by computer software contained in the microcontroller as firmware.

FIG. 9 is the logic diagram for the slave controller of the control system which identifies an initialisation sequence on power-up. This typically contains some form of self-test as well as basic initialisation.

A basic loop detects the need to start and stop and provides a soft-start sequence which is designed to ensure that current does not flow immediately into the motor. A brushless DC motor effectively presents a short-circuit to the battery when it is not rotating. This can have detrimental effect on battery life and vehicle distance when using lithium-ion batteries. By controlling the inflow of current at start-up it becomes possible to use these modern high-efficiency and high charge-density batteries.

During running, the slave controller receives signals from Hall sensors that identify precisely where each field coil is positioned in relationship to the permanent magnets. Each change of state of the Hall sensors requires the power transistors to be switch to a new configuration in accordance with logic tables published in text books.

The slave controller also communicates with the master controller while it is managing all of the other activities, to obtain instructions destined specifically for each wheel and communicates material back to the master controller in accordance with rules contained within the software.

Figure 10:
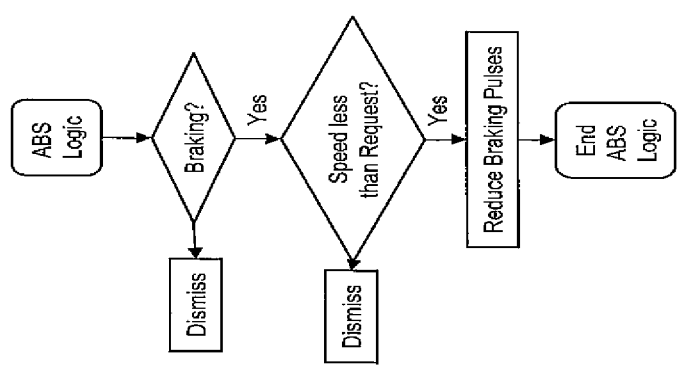
FIG. 10 is the logic diagram for Anti-Lock Braking.

FIG. 10 is the logic diagram for an anti-lock braking system that may be incorporated into the control system of the vehicle. The slave controller detects whether the master controller is requesting it to apply braking logic to the wheel. It also knows how much braking effort is being requested and manages the power transistor switching using pulses of appropriate duty-factor. If the wheel starts to rotate slower than was requested, or stalls, these pulses are adjusted in order to ensure that the wheel travels no slower than the speed requested by the master controller. This ensures that braking is even around the vehicle, as uneven braking leads to instability and poor road-holding.

Figure 11:
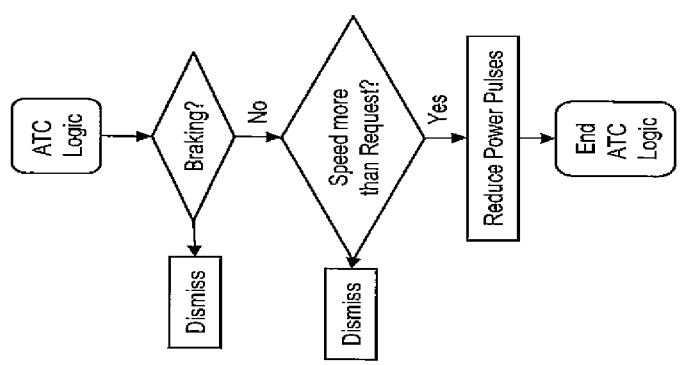
FIG. 11 is the logic diagram for the Active Traction Control.

FIG. 11 is the logic diagram for the active traction control that may be incorporated into the control system of the vehicle. This is the reverse of the anti-lock braking logic shown in FIG. 10. The controller adjusts the pulses on the power transistors to ensure that the wheel travels no faster than that requested by the master controller. If the wheel does travel faster, or spins, it will have adverse affect on the stability and road-holding of the vehicle and can cause serious damage to the terrain on which it is travelling.

Figure 12:
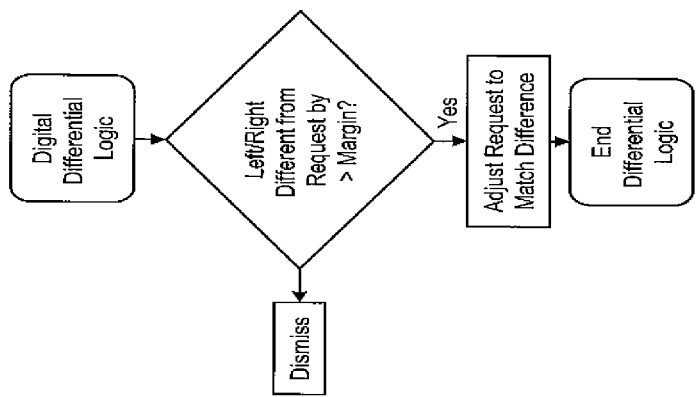
FIG. 12 is the logic diagram for the Electronic Differential.

FIG. 12 is the logic diagram for the electronic differential that may be incorporated into the control system of the vehicle. The master controller, in distilling the information coming from the slave controllers, is able to detect that the inner wheel (or wheels in a four wheel drive situation) are beginning to travel consistently slower than the other wheel or wheels which are beginning to speed up in a proportional fashion. When this is detected, the master controller sends instructions to the slave controllers to permit this speed variation. Similarly, once cornering is completed, this can be detected, the need for differential speed adjustment is dismissed and the slave controllers then revert to normal consistent speed control.

In a preferred form of the invention, the integrated wheel and motor assemblies include rare earth magnets and integrated circuit motor controllers. Each electric motor can be around 90% efficient and provides the ability to drive all four wheels of the vehicle 20 without any gearbox, differential or other transmission components.

In this instance, the current motors are HBS36R/F and HBS48R/F hub motors sourced from Golden Motor Technology Co Ltd of Changzhou, China. They are designed for double-fork bicycles and are modified for attachment from one side only. They typically have a maximum speed of 350 rpm using 36 or 48 volts. Starting torque is near maximum torque and output power is between 500 Watts and 1000 Watts.

Because of the very high motor efficiency, electronic control to limit start up current, the removal of any energy loss from a transmission and the ability to use the motors for braking as well as acceleration, it is possible to dramatically reduce the size of the battery pack and to use high efficiency batteries such as nickel metal hydride batteries, lithium-ion batteries and lithium-polymer batteries.

Preferably, the batteries are Lithium Ferrous Phosphate (LFP) batteries (one of the most recent forms of lithium-ion battery) also currently sourced from Golden Motor. However, there are now many sources of LFP batteries.

Off the shelf controllers do not contain the features required for multi-wheel operation such as anti-lock braking, active traction control and electronic differential, but do include regenerative braking.

In this instance, the control circuitry uses a 14-bit controller that operates on 8-bit data which is generally referred to as a 14-bit micro-controller and motor control integrated circuits. The control circuit could also use 8-bit and 16-bit micro-controllers. The circuitry controls the three phase brushless DC motors in the manner required for a resort or golf type car in either a two wheel or a four wheel drive configuration.

The control circuitry is adapted to start and then run the wheel at various speeds by driving six power transistors. The small amount of heat generated during the switching of the transistors is dissipated within the vehicle.

A typical 300 mm diameter motor can produce over 1 KW of power and weigh, without rims, tyres and brakes, between 5 and 7 kg. The integrated wheel and motor assembly does not drain excessive current on start up and is capable of operating at efficiencies greater than 85% across a broad range of speeds. Under general stop-start conditions (which are typical of a golf course or resort vehicle) such an integrated wheel and electric motor assembly is up to 400% more efficient than an equivalent brushed motor gearbox train.

Many benefits are provided by the electric vehicle of the invention and these include four wheel drive and front wheel drive which makes the vehicle less damaging to golf courses in wet weather and more able to be used in general resort activities where quality turf and car-paths are not available. There is also freedom of design and the removal of the motor, batteries and transmission from under the seat of conventional golf carts permits a short wheel base car to carry four forward facing passengers.

In a resort environment, small lightweight batteries can be swapped wherever the car is parked with GPS and back to base communication alerting resort staff as to the location of vehicles with marginal battery charge.

Modern batteries, with the same overall cost as large, heavy lead-acid batteries, can be used providing virtually unlimited battery life under normal operation. Lithium-ion and lithium polymer batteries have a life of over 2000 deep cycle charges and over 5000 shallow cycle charges. In a typical golf course application, this gives a battery life of around six years which leads to a significant reduction in maintenance and service disruptions.

This invention removes conventional brakes as the primary braking device and completely removes the transmission from the vehicle. But it introduces anti-lock braking, active traction control and differential wheel speed through electronic controls that are applied to the integrated wheel and motor assembly through the combination of electronic slave and master controllers.

The control system can be adjusted using password or other security controls to govern maximum speeds in order to permit the vehicle to be used by juveniles. The control system may also include regenerative braking which permits the battery to be effectively charged by applying the brakes even further increasing battery life and/or reducing battery size and weight.

The batteries may be chargeable from general purpose electrical outlets (GPO's) located throughout the area of use of the vehicle, including adjacent to an apartment or resort room. The batteries may also be chargeable from solar cells or other alternative energy sources located on the vehicle.

Various modifications may be made in details of design and construction without departing from the scope and ambit of the invention.

INDUSTRIAL APPLICABILITY

The low speed electric motor vehicles of the invention have particular application as resort cars or golf course cars.

The invention claimed is:

1. An electric motor vehicle comprising:
   (i) a chassis,
   (ii) at least one pair of integrated wheel and brushless DC electric motor assemblies mounted on the chassis using suspension components,
   (iii) a battery pack carried by the chassis and providing power to the integrated wheel and electric motor assemblies; and
   (iv) a control system for operating each said integrated wheel and motor assembly independently of each other integrated wheel and motor assembly, the control system comprising a master controller connected to the battery pack, and, a plurality of separate slave controllers connected to a battery pack, each slave controller being positioned on the vehicle adjacent to a corresponding one of said integrated wheel and motor assemblies and being connected to corresponding integrated wheel and motor assembly and to the master controller, the speed of each of the wheels being independently adjusted by a corresponding one of the slave controllers to rotate substantially at a speed requested by the master controller, wherein the speed of a first one of the wheels is adjusted by the slave controller corresponding to the first wheel to rotate substantially at the speed requested by the master controller, by adjusting power to the motor assembly of the first wheel, upon the first wheel starting to rotate slower or faster than the speed requested by the master controller.

2. The vehicle of claim 1 wherein each integrated wheel and brushless DC motor assembly provides up to 1 KW of power and weighs, without rims, tires and brakes, between 5 and 7 kg.

3. The vehicle of claim 1 wherein the master controller and the slave controllers combine in operation together to provide at least one of the following functions:
   (a) anti-lock braking whereby the wheels do not lock up when the vehicle is braking,
   (b) active traction control such that the wheels do not spin under acceleration or normal operation, and
   (c) an electronic differential such that when the vehicle is cornering, an inside one of the wheels are allowed to slow down while an outside one of the wheels speeds up.

4. The vehicle of claim 3 wherein the master controller and the slave controllers combine in operation together to provide all of the following functions:
   (a) anti-lock braking whereby the wheels do not lock up when the vehicle is braking,
   (b) active traction control such that the wheels do not spin under acceleration or normal operation, and
   (c) an electronic differential such that when the vehicle is cornering, an inside one of the wheels are allowed to slow down while an outside one of the wheels speeds up.

5. The vehicle of claim 4 comprising two pairs of the integrated wheel and motor assemblies, namely a front pair and a rear pair.

6. The vehicle according to claim 1 in which the vehicle can attain a maximum speed of only 30 kph.

7. An electric motor vehicle comprising:
(i) a chassis,
(ii) at least one pair of integrated wheel and brushless DC electric motor assemblies mounted on the chassis using suspension components,
(iii) a battery pack carried by the chassis and providing power to the integrated wheel and electric motor assemblies,
(iv) a control system for operating each said integrated wheel and motor assembly independently of each other integrated wheel and motor assembly, the control system comprising a master controller connected to the battery pack, and, a plurality of separate slave controllers connected to the battery pack, each slave controller being positioned on the vehicle adjacent to a corresponding one of said integrated wheel and motor assemblies and being connected to corresponding integrated wheel and motor assembly and to the master controller, the master controller and the slave controllers combining together to provide one or more of:
(a) an anti-lock braking function,
(b) an active traction control function, and
(c) an electronic differential function, whereby in performing the functions, the speed of each of the wheels is independently adjusted by a corresponding one of the slave controllers to rotate substantially at a speed requested by the master controller, wherein the speed of a first one of the wheels is adjusted by the slave controller corresponding to the first wheel to rotate substantially at the speed requested by the master controller, by adjusting power to the motor assembly of the first wheel, upon the first wheel starting to rotate slower or faster than the speed requested by the master controller.

8. The vehicle of claim 7 wherein the master controller and the slave controllers combine in operation together to provide all of the following functions:
(a) anti-lock braking whereby a wheel does not lock up when braking,
(b) active traction control such that a wheel does not spin under acceleration or normal operation, and
(c) an electronic differential such that in a corner, the inside wheels are allowed to slow down while the outside wheels speed up.

9. The vehicle of claim 7 wherein the vehicle has two pairs of integrated wheel and motor assemblies, namely a front pair and a rear pair.

10. The vehicle of claim 7 wherein the vehicle weighs approximately 450 kg and each integrated wheel and brushless DC motor assembly provides up to 1 KW of power and weighs, without tires, rims and brakes, between 5 and 7 kg.

11. The vehicle of claim 7, wherein the maximum speed the vehicle can travel is 30 kph.

12. The vehicle according to claim 2, wherein the master controller and the slave controllers combine in operation together to provide at least one of the following functions:
(a) anti-lock braking whereby a wheel does not lock up when braking,
(b) active traction control such that a wheel does not spin under acceleration or normal operation,
(c) an electronic differential such that in a corner, the inside wheels are allowed to slow down while the outside wheels speed up.

13. The vehicle according to claim 8, wherein the vehicle has two pairs of integrated wheel and motor assemblies, namely a front pair and a rear pair.

14. The vehicle according to claim 8, wherein the control system provides for regenerative braking and wherein the battery pack is connected to a power storage means and during regenerative braking power is fed to the power storage means as part of the vehicle's braking functions.

15. The vehicle according to claim 8, wherein the vehicle weighs approximately 450 kg and each integrated wheel and brushless DC motor assembly provides up to 1 KW of power and weighs, without tires, rims and brakes, between 5 and 7 kg.

16. The vehicle according to claim 8, wherein the maximum speed the vehicle can travel is only 30 kph.

17. The vehicle according to claim 1, wherein the speed of the first wheel is adjusted by the corresponding slave controller by reducing braking power to the motor assembly of the first wheel, if the first wheel starts to rotate slower than the speed requested by the master controller.

18. The vehicle according to claim 1, wherein the speed of the first wheel is adjusted by the corresponding slave controller by reducing running power to the motor assembly of the first wheel, if the first wheel starts to rotate faster than the speed requested by the master controller.

19. The vehicle according to claim 1, wherein the brushless DC electric motor assemblies are mounted on the chassis using passive suspension components.

20. The vehicle according to claim 1, the vehicle being without any gearbox, differential or other mechanical transmission components.

21. The vehicle according to claim 1, the vehicle being without any active suspension components.

22. The vehicle according to claim 7, wherein the speed of the first wheel is adjusted by the corresponding slave controller by reducing braking power to the motor assembly of the first wheel, if the first wheel starts to rotate slower than the speed requested by the master controller.

23. The vehicle according to claim 7, wherein the speed of the first wheel is adjusted by the corresponding slave controller by reducing running power to the motor assembly of the first wheel, if the first wheel starts to rotate faster than the speed requested by the master controller.

24. The vehicle according to claim 7, wherein the brushless DC electric motor assemblies are mounted on the chassis using passive suspension components.

25. The vehicle according to claim 7, the vehicle being without any gearbox, differential or other mechanical transmission components.

26. The vehicle according to claim 7, the vehicle being without any active suspension components.

27. The vehicle according to claim 1, wherein each of the slave controllers comprises a microcontroller configured to determine the speed of a corresponding wheel, in order to ensure a minimum difference between the speed of the corresponding wheel and the speed requested by the master controller.

* * * * *